Figures 1, 2:
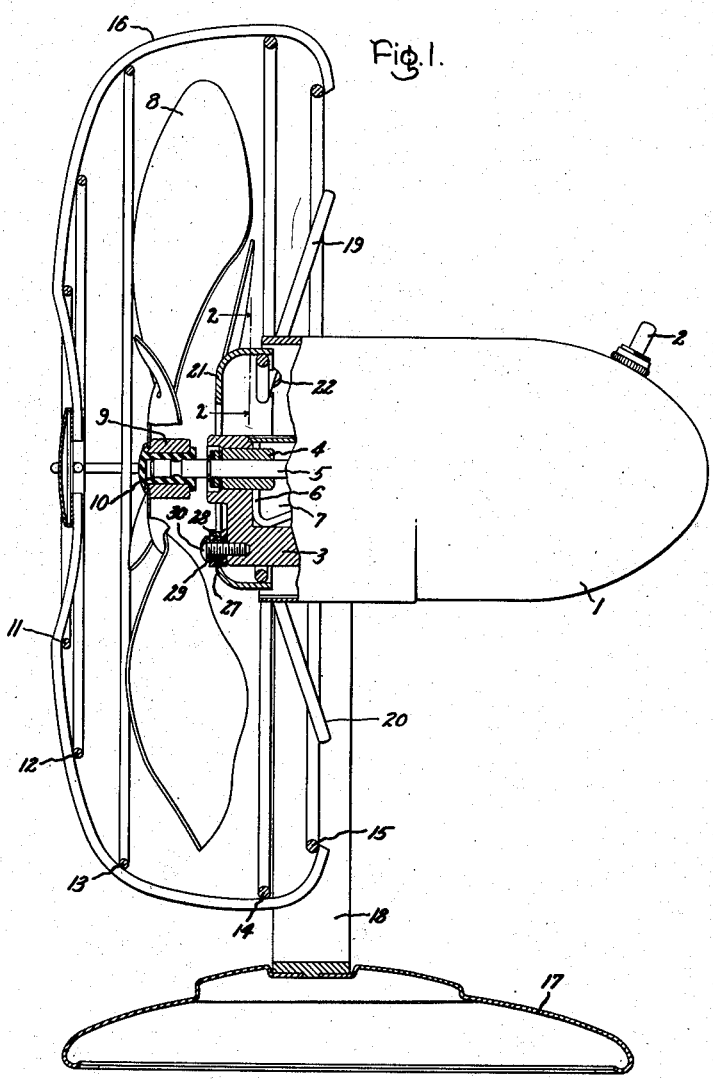

Feb. 17, 1953    H. W. UHLRIG    2,628,771
ELECTRIC FAN HAVING A RESILIENTLY SUPPORTED MOTOR
Filed Oct. 31, 1950

Inventor:
Harry W. Uhlrig,
by (signature)
His Attorney.

Patented Feb. 17, 1953

2,628,771

UNITED STATES PATENT OFFICE 2,628,771

ELECTRIC FAN HAVING A RESILIENTLY SUPPORTED MOTOR

Harry W. Uhlrig, Stratford, Conn., assignor to General Electric Company, a corporation of New York Application October 31, 1950, Serial No. 193,149

4 Claims. (Cl. 230—259)

This invention relates to electric fans of the desk or pedestal type and more particularly to an improved arrangement for supporting the fan motor and blade guard.

An important prerequisite for electric fans of the type commonly used for ventilation of homes and offices is that the noise level be kept to an absolute minimum. There are several sources within the fan of noise producing vibrations. Many of the most troublesome noises are produced by the motor itself. For example, motors commonly used for electric fans are built with a laminated core giving rise to vibration or humming of the core itself under the influence of the electrical excitation. In addition, the shaded pole induction motors commonly used for electric fans do not produce absolutely uniform torque for every position of the rotor. In operation, this gives rise to torque vibrations. Also, the fan blades themselves tend to set up vibrations, which in turn may be transferred to the motor driving shaft.

With conventional fan supports, the various vibrations from the motor are transferred through the rigid supporting arm to the fan base. The supporting arm materially increases the radius of action of these vibrations, resulting in an amplification of the vibration noises. Furthermore, since the base is normally resting on a larger surface, the entire surface tends to vibrate and radiate with amplified volume the various noises arising from the motor. In addition, the guard, usually constructed of wire and rigidly attached to the motor frame, also serves to radiate motor vibrations.

It is an object of my invention to correct and eliminate the transfer of motor vibrations by completely isolating the motor from the fan blade guard and the motor supporting structure.

In addition, it is an object of my invention to reduce the radius of action of motor produced vibrations, thereby permitting the use of stiffer material in the fan blade guard and supporting yoke.

It is a further object of my invention to provide a support for a fan motor in which the motor is supported entirely through the fan blade guard. Still another object of my invention is to provide a resilient interconnection between the fan motor and fan blade guard.

To this end, an important feature of the present invention consists in supporting the motor solely from the fan blade guard, near the center of the guard, the guard in turn being supported from a base through the use of a yoke or other suitable arrangement. A further feature of this invention consists in a resilient connection between the blade guard and the frame of the motor near the motor axis, such resilient connection employing rubber or other vibration damping material.

The features of my invention which I believe to be novel are set forth with particularity in the appended claims. My invention itself, however, both as to its organization and method of operation, together with further objects and advantages thereof, may best be understood by reference to the following description taken in connection with the accompanying drawing, in which Fig. 1 is a side elevation, partially in section, of an electric fan embodying my invention, and Fig. 2 is a partial cross-sectional view taken on the line 2—2 of Fig. 1.

Referring to Fig. 1 of the drawing, I have shown my invention embodied in an electric fan of the desk type driven by any suitable type of motor (not shown) enclosed in an outer casing 1. A suitable switch 2 may be provided for turning the fan on or off, or for speed control. Unitary with the motor is a frame 3 carrying a front bearing 4. The motor shaft 5 is journaled in this bearing. A wick such as 6 may be positioned in a lubricant reservoir 7 formed as an integral part of frame 3 to conduct lubricant to bearing 4. A fan blade assembly 8 is carried on the outer end of the motor shaft, with the hub 9 of this assembly including a resilient liner 10, of rubber or like material. This resilient bushing or liner 10 absorbs and prevents transmission of the vibrations between the motor and the fan blades. The bushing connection shown here is of the type claimed in Patent 2,558,589—Skolfield, assigned to the same assignee as the present application.

The fan blade assembly 8 is enclosed within a blade guard for safety. This guard may be of a conventional construction comprising a plurality of circular wire guard members 11, 12, 13, 14 and 15, as shown in Fig. 1. These circular wire members in turn are secured by welding or other suitable means to a transversely extending wire framework 16.

For supporting the fan motor, blade guard, and blade assembly, I employ a suitable base 17. Secured to this base is a yoke 18 providing upwardly extending arms, which at their upper ends are connected to diametrically opposite points of the periphery of the guard assembly in any suitable fashion. Thus it is seen that the supporting arms are connected only to the blade guard and there is no direct connection to the motor frame, as was conventional with prior constructions. While I prefer to use a yoke for attaching the guard assembly to the base, it will be obvious that other types of supporting arms could be used, or if preferred, the guard assembly could be attached directly to base 17.

As shown in Fig. 1, the rear ring 15 of the guard has secured thereto by welding or other suitable means radially inwardly extending guard supporting members, such as 19 and 20. The guard supporting members 19 and 20 are further secured at their inner ends to a motor end cap 21, here shown as having a cup-shape. This arrangement will become more apparent by a reference to Fig. 2. As shown, I provide slots 22 and 23 in the inner end of casing 1, which slots are in alignment with similar slots 24 and 25 respectively in end cap 21. It should be noted at this point that the guard supporting member 19 is not in direct contact at any point with the motor enclosing casing 1. However, the inner portion of the guard supporting member is provided with an arcuate shape as at 26 to conform with the inner surface of end cap 21. Preferably, the guard supporting wire 19 is rigidly affixed to this end cap by suitable fastening means or by welding. Likewise, the guard supporting member 20 is secured to end cap 21, and similarly is out of contact with the enclosing casing 1. It may be noted further that neither of these guard supporting members are in direct contact with the frame 3.

Referring again to Fig. 1, end cap 21 provides the sole connection from the motor and its frame 3 to the blade guard assembly and the supporting structure. Hence, with this construction, I am able to attach the motor to the remainder of the fan assembly in a manner completely isolating vibrations of both the motor and the fan blades from the guard and supporting frame. As shown in Fig. 1, end cap 21 may be apertured as at 27 close to the motor shaft opening to receive a resilient grommet 28 of soft rubber or similar vibration absorbing material. Grommet 28 is apertured to receive a metal thimble 29 through which attaching screw 30 may extend for threaded engagement with a tapped recess on the motor frame 3. Thimble 29 abuts against the head of the screw 30 at one of its ends and against the motor frame at its opposite end and thereby prevents compression of the resilient grommet 28. Obviously a shouldered screw could be employed for this purpose rather than employing thimble 29.

While in Fig. 1 I have shown only one point of attachment of end cap 21 to the motor frame, it is to be understood that a plurality of such connection points may be used, and in practice I prefer to employ three, whereby end cap 21 is firmly, but resiliently held in position with respect to the motor frame.

By the construction shown it may be seen that I have eliminated entirely any metal to metal contact between the motor, the fan blade assembly, the fan blade guard assembly, and the supporting arms. The two components of the fan which tend to create vibrations have been isolated completely from the remainder of the structure. In addition, any vibrations arising out of operation of the motor have an extremely short radius of action before being absorbed by the resilient mounting. Furthermore, with this construction, the surfaces radiating vibration have been reduced to the minimum possible area and, in particular, the supporting base for the fan assembly is entirely isolated from the vibration producing components.

While the present invention has been described by reference to a particular embodiment thereof, it will be understood that numerous modifications may be made by those skilled in the art without actually departing from the invention. I therefore aim in the appended claims to cover all such equivalent variations as come within the true spirit and scope of the foregoing disclosure.

What I claim as new and desire to secure by Letters Patent of the United States is:

1. In an electric fan having a motor with a shaft including a frame therefor and a fan blade driven by the motor shaft, that improvement comprising a supporting base, a wire guard enclosing the fan blade, means supporting said wire guard from said base, an end cap for said motor frame attached to and carried by said guard near the center thereof and vibration damping means resiliently interconnecting said motor frame to said end cap close to said motor shaft, whereby said motor is isolated from said guard, supporting means and base.

2. In an electric fan having a motor with a shaft including a frame therefor and a fan blade driven by the motor shaft, means supporting said motor comprising a base member, a fan blade guard enclosing the blade, means supporting said fan blade guard from said base, an end cap for said motor frame integrally connected to and carried by said guard near the center thereof, said end cap including an aperture through a portion thereof close to said motor shaft, and vibration damping means within said aperture resiliently interconnecting said motor frame to said end cap, whereby said motor is supported solely through said vibration damping means with respect to said base and at a short radius from said motor shaft.

3. In an electric fan having a motor with a shaft including a frame therefor and a fan blade assembly driven by the motor shaft, that improvement comprising a supporting base, a wire guard enclosing said fan blade assembly, means supporting said wire guard from said base, an end cap for said motor frame affixed to and carried by said guard near the center thereof, said end cap including an aperture through a portion thereof close to said motor shaft, and vibration damping means interconnecting said motor frame to said end cap extending through said aperture, said last mentioned means comprising an apertured resilient grommet extending through said aperture and between said motor frame and end cap, a thimble extending through said grommet, and fastening means rigidly attaching said thimble to said motor frame, said thimble limiting the compression of said grommet by said fastening means.

4. An electric fan comprising motor driven fan blades, a frame for the driving motor, an end cap for said motor having an aperture therein close to the axis of the motor, a resilient grommet positioned within said aperture and extending between said motor frame and said end cap, a thimble extending through said grommet, said thimble being spaced from said end cap by said grommet, fastening means rigidly attaching said thimble to said motor frame, said thimble limiting the compression of said grommet by said fastening means, a wire guard encompassing the fan blades and being affixed to said end cap near the center of the guard, a supporting base, and means supporting said wire guard from said base.

HARRY W. UHLRIG.

REFERENCES CITED

The following references are of record in the file of this patent:

UNITED STATES PATENTS

| Number | Name | Date |
|---|---|---|
| D. 100,690 | Frisbie | Aug. 4, 1936 |
| 1,863,043 | Johnson | June 14, 1932 |
| 2,123,448 | Weber | July 12, 1938 |
| 2,129,933 | Hueglin | Sept. 13, 1938 |